May 16, 1967 R. K. SUGALSKI 3,320,097
RESEALABLE VENT FOR A SEALED CASING
Filed Aug. 6, 1964 2 Sheets-Sheet 1

INVENTOR
RAYMOND K. SUGALSKI

BY Frank G. Neuhauser
ATTORNEY

May 16, 1967   R. K. SUGALSKI   3,320,097
RESEALABLE VENT FOR A SEALED CASING
Filed Aug. 6, 1964   2 Sheets-Sheet 2

INVENTOR
RAYMOND K. SUGALSKI

BY *Frank L. Neuhauser*
ATTORNEY

# United States Patent Office 3,320,097
Patented May 16, 1967

3,320,097
RESEALABLE VENT FOR A SEALED CASING
Raymond K. Sugalski, Gainesville, Fla., assignor to General Electric Company, a corporation of New York
Filed Aug. 6, 1964, Ser. No. 387,868
14 Claims. (Cl. 136—178)

This invention relates to a resealable vent useful for relieving abnormal pressures within a sealed casing. More specifically, it relates to a resealable vent designed for use with a sealed casing enclosing an electrical device.

Prior art sealed casings designed for housing rechargeable nickel-cadmium batteries and other electrical devices which may at times produce gases within the sealed casing have been provided with safety vents. These vents, while providing the safety feature of releasing abnormally high pressures created in a casing when a gas is produced, have had the disadvantage of remaining open after the abnormal pressure has been relieved. In other words, casings provided with the prior art vents are hermetically sealed until the vents are open due to abnormally high internal pressure, but once the vents are opened they remain open and therefore the advantages of hermetically sealed casings are no longer present.

It is an object of this invention to provide a self-resealing vent for a sealed casing.

It is an object of this invention to provide a resealing vent for a sealed casing which automatically opens upon the development of a predetermined abnormally high internal pressure, and reseals itself after the pressure has been relieved.

It is another object of this invention to provide a self-resealing vent for a sealed casing housing a rechargeable battery which is capable of multiple opening and closing operations.

These objects are accomplished in accordance with this invention, in one form thereof, by providing a vent hole in a cap portion of a sealed casing. A recess is formed in the outer surface of the cap portion over the vent hole. A member having a head at one end is provided with a stem which is disposed within the vent hole. A resilient washer is placed within the recess and disposed between the bottom surfaces of the head and recess and circumjacent the stem. A seal is formed between the head and the cap portion by squeezing the washer between the head and the cap portion. An increased pressure within the casing will cause the washer to be expanded radially within the recess. A further increase in pressure will cause the seal between the head and the cap portion to be temporarily broken to release the pressure within the casing. The deformation of the washer causes energy to be stored within it, which after release of the pressure within the casing, forces the washer back into the position wherein a seal is again formed between the head and the cap.

Figure 4A:
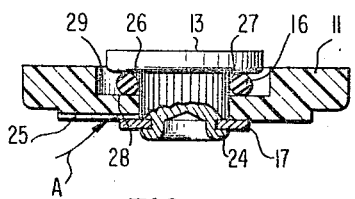
Figure 4B:
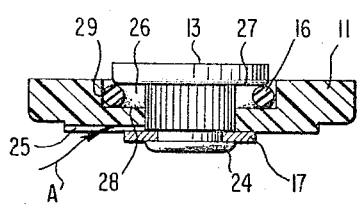
Figure 4C:
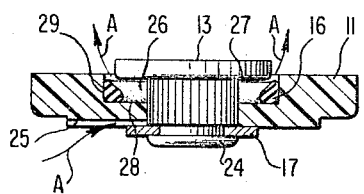

FIGURES 4a, 4b and 4c include sectional views of the cap provided with the resealable vent showing the resealable vent under three different conditions.

Figure 5:
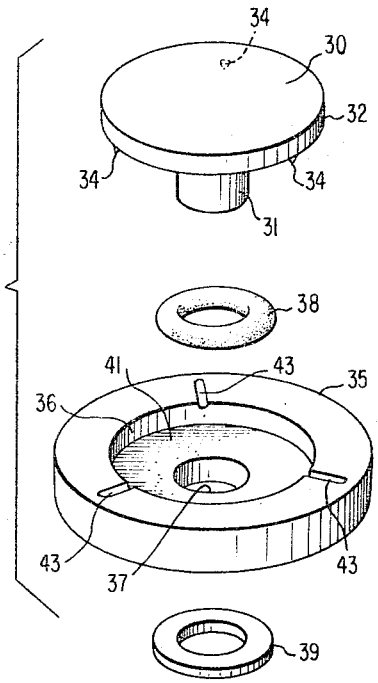

FIGURE 5 is an exploded view of a casing cap and the elements of a resealable vent constructed in accordance with an alternate embodiment of this invention.

Figure 6A:
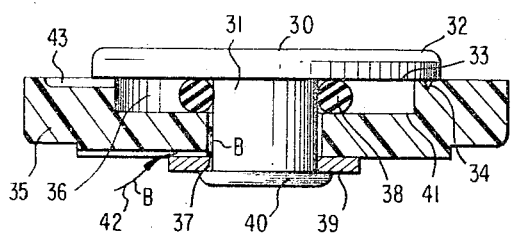
Figure 6B:
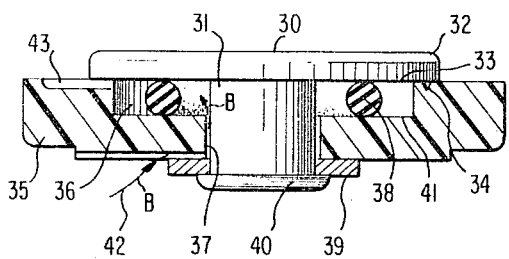
Figure 6C:
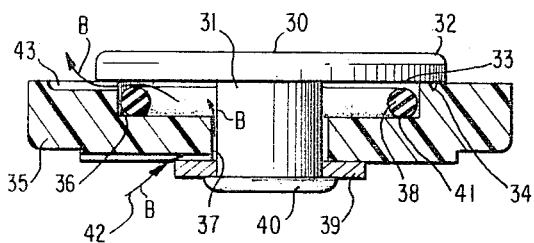

FIGURES 6a, 6b and 6c include sectional views of the cap provided with the resealable vent of the alternate embodiment of this invention, showing the resealable vent under three different conditions.

Figure 1:
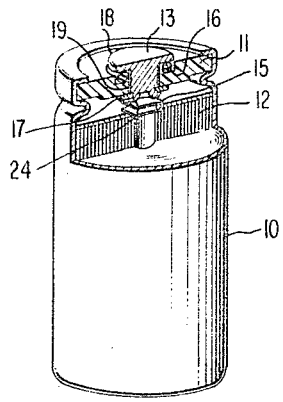
FIGURE 1 is a perspective view of a sealed casing with a portion removed to reveal a resealable vent.

By reference to FIGURE 1 of the drawings, it will be seen that in a first embodiment of this invention, the electrical device is housed within a metal casing 10. The cap portion or cap 11 is formed as a cylindrical disc of insulating material which is sealed to the metal casing 10.

The resealable vent of this invention is useful in sealed casings which enclose electrical devices which tend to give off gases with a resultant rise of pressure within the casing. The resealable vent may for example be used in a casing enclosed in a rechargeable battery such as is shown by the laminate structure 12. The metal casing 10 forms one terminal of the electrical device, while rivet 13 forms the other terminal. Rivet 13 is connected to the electrical device by a conductive metal strip 15.

Figure 2:
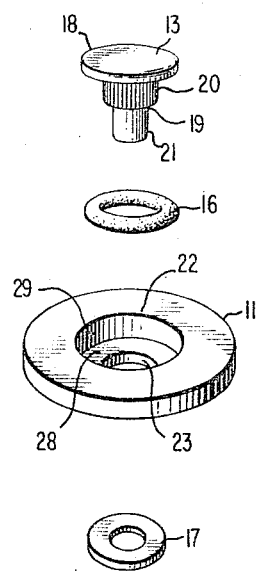
FIGURE 2 is an exploded view of a casing cap and the elements of a resealable vent.

The resealable vent includes the rivet 13, the cap 11, a resilient O-ring 16, and a metal washer 17, as best shown in FIGURE 2. The rivet is provided with a cylindrical head 18 and a cylindrical stem 19. The stem includes a fluted portion 20, adjacent to the head 18, and a portion 21 of reduced diameter. A cylindrical recess 22 is formed in the top surface of the cap 11. A hole 23 passes through the cap 11 at the center of the recess 22. The stem 19 of the rivet passes through the hole 23, and the resilient O-ring 16 is interposed between head 18 and the recess 22. A washer 17 is placed over the stem portion 21, and the stem is then upset over the washer, as shown at 24. The resilient O-ring 16 is maintained in slight compression between the head and the recess which are in fixed spaced relation to each other so as to form a seal between them.

Figure 3:
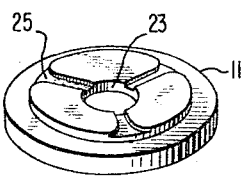
FIGURE 3 is a perspective view of the bottom of the casing cap.

Passageways are provided between the wall of the hole 23 in the cap 11 and the stem 19 by the fluted portion 20 of the stem. Grooves 25 are provided in the bottom of the cap 11, as shown in FIGURE 3, to provide passageways between the washer 17 and the cap 11. Referring to FIGURE 4a, the arrows A show the gas from within the casing entering the grooves 25, wherein it flows through the passageways formed between the cap 11 and the washer 17 to the passageways formed by the fluted portion 20 between the stem 19 and the cap 11. Gas flows along the fluted portion 20 to the space 26 formed between the bottom surface 27 of the head, the bottom surface 28 of the recess, and the O-ring 16.

The resealable vent is shown in its normally closed position in FIGURE 4a. The O-ring 16 is shown in abutting relationship with the fluted portion 20 of the rivet stem 19, with the flat smooth bottom surface 27 of the head 18, and with the flat smooth bottom surface 28 of the recess 22. With the O-ring compressed between the flat smooth surfaces 27 and 28 a seal is formed between them and the O-ring to prevent the entrance or escape of gases from the sealed casing.

Should the pressure within the casing increase, the O-ring is expanded, and continues to expand until it reaches the position shown in FIGURE 4b wherein it has just contacted the cylindrical wall 29 of the recess 22. In this position, the O-ring still forms a gas-tight seal between itself and the bottom surface 27 of the head 18 and bottom surface 28 of the recess.

Should a further increase in gas pressure occur, the O-ring is deformed against the cylindrical wall 29. When a pressure above a predetermined maximum has developed within the casing, the O-ring breaks away from the bottom surface 27 of the head 18 to permit the gas to escape between the O-ring 16 and the head 18, as is shown in FIGURE 4c. After the instantaneous escape of the gas and the resultant decrease in gas pressure within the casing, the resilient energy stored in the O-ring 16 by its deformation against the cylindrical wall 29 of the recess 22, causes it to pass through the position shown in FIGURE 4b, and return to the position shown in FIGURE 4a. Because of the resilient energy stored in the O-ring due to its deformation against the cylindrical wall 29, the O-ring is returned to its initial position shown in FIG- URE 4a not only due to its tendency to return to normal size, but also due to the resilient energy stored in it.

A second embodiment of the resealable vent of this invention comprises the same four elements as the first embodiment, but with some modifications as are best seen in FIGURE 5. The rivet 30 is provided with a smooth cylindrical stem 31 of uniform cross section, and a cylindrical head 32. The bottom surface 33 of the head is a smooth flat surface, but is provided with teeth 34 near its perimeter. The cap 35 is similar to the cap of a first embodiment in that it is provided with a cylindrical recess 36 in its outer surface and with a hole 37 passing through the cap at the center of the recess 36.

The cylindrical stem 31 of the rivet is of a lesser diameter than the hole 37, whereby the stem is loosely received within the hole, with a resilient O-ring 38 being interposed between the head 32 and the recess 36. A washer 39 is placed over the stem 31 and the stem is then upset over the washer.

The cylindrical head 32 of the rivet is of greater diameter than of the cylindrical recess 36, as is best seen in FIGURE 6a. The teeth 34 are pressed into the top surface of the cap 35, so that the bottom surface 33 of the rivet head abuts the top surface of the cap. The teeth 34 are provided to prevent rotation of the rivet 30 with respect to the cap 35. With the end of the stem 31 upset as shown at 40, the bottom surface 33 of the rivet head is maintained in engagement with the top surface of the cap. The O-ring 38 has an internal diameter approximately equal to the diameter of the cylindrical stem 31, as shown in FIGURE 6a. The cross-sectional diameter of the O-ring 38 is slightly greater than the depth of the recess 36, whereby the O-ring 33 is maintained in slight compression between the flat bottom surface 33 of the cylindrical head 32, and the flat bottom surface 41 of the recess 36.

As previously discussed with respect to the first embodiment, grooves 42 are formed in the bottom surface of the cap 35 to provide passageways between the washer 39 and the cap 35. The arrows B show the flow of gas from within the casing entering the grooves 41, wherein it flows through the passageways formed between the cap 35 and the washer 39 to a passageway formed between the hole 37 and the cylindrical stem 31 which is loosely received within the hole.

The resealable vent is shown in its normally closed position in FIGURE 6a. The O-ring 38 is shown in abutting relationship with the cylindrical stem 31, with the flat smooth bottom surface 33 of the head 32, and with the flat smooth bottom surface 40 of the recess 36. With the O-ring compressed between the flat smooth bottom surfaces 33 and 41, a seal is formed between them and the O-ring to prevent the entrance of gas into the sealed casing, or the escape of gas from the sealed casing.

With an increase of pressure within the casing the O-ring is expanded, and will continue to expand as shown in FIGURE 6b, wherein it is of an increased diameter and reduced cross section, but is still compressed between the flat bottom surfaces 33 and 41 to maintain a seal between them. Further expansion of the O-ring within the recess results in a continuing decrease of the cross-sectional area of the O-ring until, as is shown in FIGURE 6c, when a predetermined maximum pressure is exceeded, the O-ring is of such a reduced cross-sectional diameter that it breaks away from the flat smooth bottom surface 33 of the head 32 to permit the gas to escape between the O-ring 38 and the head 32. Grooves 43 are formed in the top surface of the head to permit the escape of the gas from the recess to the surrounding atmosphere as indicated by the arrows B. After the instantaneous escape of the gas and the resultant decrease of gas pressure within the casing, the resilient energy stored in the O-ring 38 by its considerable stretching causing it to contract, passing through the position shown in FIGURE 6b, to its initial position shown in FIGURE 6a.

A cap provided with a resealable vent as shown in either of the illustrated embodiments of this invention is placed over the electrical component 12 in a metal casing 10. The metal casing is then flared over the cap 11 as is shown in FIGURE 1, to secure the cap to the casing.

While particular embodiments of the invention have been shown, other embodiments of the invention will be apparent to those skilled in the art, and it is intended to cover by the appended claims all embodiments falling within the scope thereof.

What I claim as new and desire to secure by Letters Patent of the United States is:

1. A resealable vent for a sealed casing comprising:
    (a) a sealed casing including a cap portion having a vent hole therein,
    (b) a member having a head at the outer end and a stem extending from said head and received in said hole,
    (c) a resilient washer disposed between said head and said cap portion and being circumjacent said stem, and
    (d) means for securing said member to said cap portion with the inner face of said head in fixed relation to the face of the cap portion axially adjacent to said head face and for causing said washer to be normally slightly compressed between said cap portion and said head so as to form a seal between said cap portion and said head,
    (e) said washer being radially outwardly expanded by abnormally high pressure within said casing to temporarily break the seal to relieve the abnormally high pressure,
    (f) the resilient energy stored in said washer causing it to radially contract and again form a seal between said cap portion and said head.

2. The resealable vent defined in claim 1 wherein the end of said stem is upset to secure said member to said cap portion, and to effect slight compression of said resilient washer.

3. A resealable vent for a sealed casing comprising:
    (a) a sealed casing including a cap portion, said cap portion having a recess in its top surface and a vent hole concentric with and opening into said recess,
    (b) a member having a head at the outer end and a stem extending from said head and received in said hole,
    (c) a resilient washer disposed within said recess between said head and said cap portion and being circumjacent said stem, and
    (d) means for securing said member to said cap portion with the inner face of said head in fixed relation to the face of the cap portion axially adjacent to said head face and causing said washer to be normally slightly compressed between said cap portion and said head so as to form a seal between said cap portion and said head.
    (e) said washer being radially outwardly expanded by abnormally high pressure within said casing to temporarily break the seal to relieve the abnormally high pressure,
    (f) the resilient energy stored in said washer causing it to radially contract and again form a seal between said cap portion and said head.

4. A resealable vent for a sealed casing comprising:
    (a) a sealed casing including a cap portion, said cap portion having a cylindrical recess in its top surface and a cylindrical vent hole concentric with and opening into said recess,
    (b) a member having a head at the outer end and a cylindrical stem extending from said head and received in said hole,
    (c) a resilient O-ring disposed within said recess between said head and said cap portion and encircling said stem, and (d) means for securing said member to said cap portion with the inner face of said head in fixed relation to the face of the cap portion axially adjacent to said head face and causing said O-ring to be normally slightly compressed between said cap portion and said head so as to form a seal between said cap portion and said head, (e) said O-ring being radially outwardly expanded within said recess by abnormally high pressure within said casing to temporarily break the seal to relieve the abnormally high pressure, (f) the resilient energy stored in said O-ring causing it to radially contract and again form a seal between said cap portion and said head.

5. The resealable vent defined in claim 4 wherein said member comprises a terminal for an electrical device enclosed within said sealed casing.

6. The resealable vent defined in claim 4 wherein said cap portion is a separate member formed from an insulating material.

7. A resealable vent for a sealed casing comprising:
(a) a sealed casing including a cap portion, said cap portion having a cylindrical recess in its top surface and a cylindrical vent hole concentric with and opening into the center of said recess,
(b) a member having a cylindrical head at the outer end and a cylindrical stem extending from said head and received in said hole, said cylindrical head being of a lesser diameter than said recess,
(c) a resilient O-ring disposed within said recess between said head and said cap portion and encircling said stem, and
(d) means for securing said member to said cap portion with the inner face of said head in fixed relation to the face of the cap portion axially adjacent to said head face and causing said O-ring to be normally slightly compressed between said cap portion and said head so as to form a seal between said cap portion and said head,
(e) said O-ring being radially outwardly expanded within said recess by abnormally high pressure within said casing to engage and to be resiliently deformed agianst the walls of said recess,
(f) said O-ring being resiliently deformed until the seal between said O-ring and said head is temporarily broken to relieve the abnormally high pressure,
(g) the resilient energy stored in said O-ring due to said deformation causing it to radially contract and again form a seal with said head.

8. A resealable vent for a sealed casing comprising:
(a) a sealed casing including a cap portion, said cap portion having a cylindrical recess in its top surface and a cylindrical vent hole concentric with and opening into the center of said recess, the bottom surface of said recess being flat and smooth,
(b) a member having a cylindrical head at the outer end and a cylindrical stem extending from said head and received in said hole, said cylindrical head having a flat smooth bottom surface and being of a lesser diameter than said recess,
(c) a resilient O-ring disposed within said recess between said flat smooth bottom surface of said head and said flat smooth bottom surface of said recess and encircling said stem, and
(d) means for securing said member to said cap portion with the bottom surface of said head in fixed relation to the bottom surface of the recess and causing said O-ring to be normally slightly compressed between said cap portion and said head so as to form a seal between said cap portion and said head,
(e) said O-ring being radially outwardly expanded within said recess to a greater diameter than said cylindrical head by abnormally high pressure within said casing to temporarily break the seal between said head and said O-ring to relieve the abnormally high pressure,
(f) the resilient energy stored in said O-ring causing it to radially contract and again form a seal with said head.

9. A resealable vent for a sealed casing comprising:
(a) a sealed casing including a cap portion, said cap portion having a cylindrical recess in its top surface and a cylindrical vent hole concentric with and opening into the center of said recess, the bottom surface of said recess being flat and smooth,
(b) a member having a cylindrical head at the outer end and a concentric cylindrical stem extending from said head and passing through said hole, said cylindrical head having a flat smooth bottom surface and being of a lesser diameter than said recess.
(c) a resilient O-ring disposed within said recess between said flat smooth bottom surface of said head and said flat smooth bottom surface of said recess, and
(d) a washer passing over said stem,
(e) the end of said stem being upset to secure said washer against the bottom surface of said cap portion with the bottom surface of said head in fixed relation to the bottom surface of the recess and cause said O-ring to be normally slightly compressed between said cap portion and said head so as to form a seal between said cap portion and said head,
(f) said O-ring being radially outwardly expanded within said recess to a greater diameter than said cylindrical head by abnormally high pressure within said casing to temporarily break the seal between said head and said O-ring to relieve the abnormally high pressure,
(g) the resilient energy stored in said O-ring causing it to radially contract and again form a seal with said head.

10. The resealable vent defined in claim 7 wherein said cylindrical stem is fluted so as to form passageways between said cap portion and said stem, and grooves are formed on the bottom surface of said cap portion to form passageways between said cap portion and said washer.

11. A resealable vent for a sealed casing comprising:
(a) a sealed casing including a cap portion, said cap portion having a cylindrical recess in its outer surface and a cylindrical vent hole concentric with and opening into the center of said recess.
(b) a member having a cylindrical head at the outer end and a cylindrical stem extending from said head and received in said hole, said cylindriical head being of greater diameter than said recess,
(c) a resilient O-ring disposed within said recess between said head and said cap portion and encircling said stem, and
(d) means for securing said member to said cap portion with the inner face of said head in fixed relation to the face of the cap portion axially adjacent to said head face and causing said O-ring to be normally slightly compressed between said cap portion and said head so as to form a seal between said cap portion and said head,
(e) said O-ring being radially outwardly expanded within said recess by abnormally high pressure within said casing until the seal between said O-ring and said head is temporarily broken to relieve the abnormally high pressure,
(f) the resilient energy stored in said O-ring due to said expansion causing it to radially contract and again form a seal with said head.

12. The resealable vent defined in claim 11 wherein the bottom surface of said cylindrical head is provided with teeth which engage the top surface of said cap portion to prevent rotation of said member with respect to said cap portion.

13. A resealable vent for a sealed casing comprising:
(a) a sealed casing including a cap portion, said cap portion having a cylindrical recess in its top surface and a cylindrical vent hole concentric with and opening into the center of said recess, the bottom surface of said recess being flat and smooth,
(b) a member having a cylindrical head at the outer end and a cylindrical stem extending concentrically from said head and received in said hole, said cylindrical head having a flat smooth bottom surface and being of a greater diameter than said recess,
(c) a resilient O-ring disposed within said recess between said flat smooth bottom surface of said head and said flat smooth bottom surface of said recess and encircling said stem, and
(d) means for securing said member to said cap portion with said flat smooth bottom surface of said head engaging the top surface of said cap portion in fixed relation thereto and causing said O-ring to be normally slightly compressed between said cap portion and said head so as to form a seal between said cap portion and said head,
(e) said O-ring being radially outwardly expanded within said recess by abnormally high pressure within said casing to temporarily break the seal between said head and said O-ring due to the reduction in the cross-sectional area of said O-ring to relieve the abnormally high pressure,
(f) the resilient energy stored in said O-ring due to said expansion causing it to radially contract and again form a seal with said head.

14. A resealable vent for a sealed casing comprising:
(a) a sealed casing including a cap portion, said cap portion having a cylindrical recess in its outer surface with grooves in the top surface entering into said recess, and a cylindrical vent hole concentric with and opening into the center of said recess, the bottom surface of said recess being flat and smooth,
(b) a member having a cylindrical head at the outer end and a cylindrical stem extending concentrically from said head and passing through said hole, said cylindrical head having a flat smooth bottom surface and being of a greater diameter than said recess, the flat smooth bottom surface of said head engaging the outer surface of said cap portion in fixed relation thereto, and
(c) a resilient O-ring disposed within said recess between said flat smooth bottom surface of said head and said flat smooth bottom surface of said recess, and
(d) a washer passing over said stem,
(e) the end of said stem being upset to secure said washer against the bottom surface of said cap portion and to cause said O-ring to be normally slightly compressed between said cap portion and said head so as to form a seal between said cap portion and said head,
(f) said O-ring being radially outwardly expanded within said recess by abnormally high pressure within said casing to decrease the cross-sectional area of said O-ring, and to temporarily break the seal between said head and said O-ring to relieve the abnormally high pressure by allowing gas to escape from said recess through said grooves in the top surface of said cap portion,
(g) the resilient energy stored in said O-ring causing it to radially contract and again form a seal with said head.

References Cited by the Examiner

UNITED STATES PATENTS

| | | | |
|---|---|---|---|
| 866,938 | 9/1907 | Kinsey. | |
| 2,552,642 | 5/1951 | Morrison | 220—44 |
| 2,614,793 | 10/1952 | Storm. | |
| 2,743,841 | 5/1956 | Bugel | 220—44 X |
| 3,114,659 | 12/1963 | Warren | 136—178 |

THERON E. CONDON, *Primary Examiner.*

J. R. GARRETT, *Assistant Examiner.*